JOSEPH LA CROIX, OF CHICOPEE, MASSACHUSETTS, ASSIGNOR TO HIMSELF AND EDMOND RICHARDS, OF SAME PLACE.

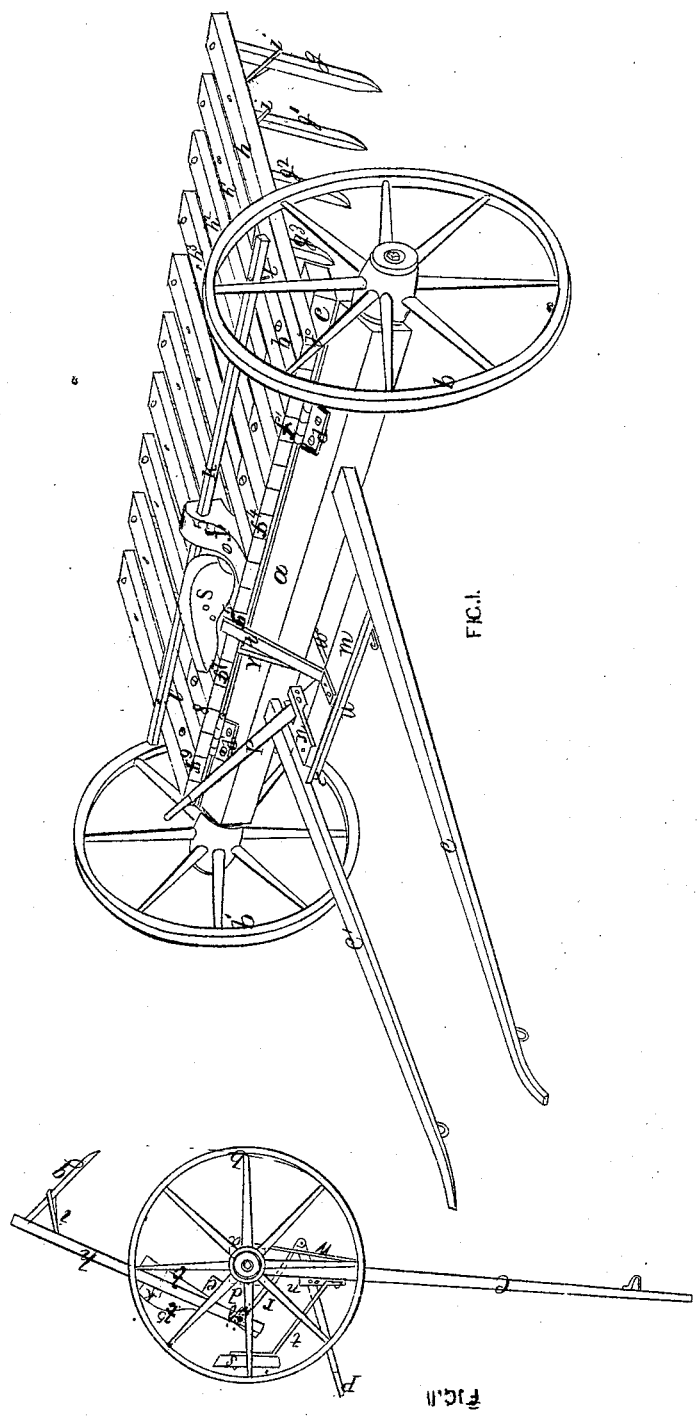

Letters Patent No. 87,782, dated March 16, 1869.

IMPROVEMENT IN HORSE-RAKES.

The Schedule referred to in these Letters Patent and making part of the same.

*To all whom it may concern:*

Be it known that I, JOSEPH LA CROIX, of Chicopee, in the county of Hampden, and State of Massachusetts, have made and invented certain new and useful Improvements in Horse-Rakes; and I do hereby declare that the following is a full, clear, and exact description of the construction and operation of the same, reference being had to the annexed drawings, making a part of this specification, in which like letters mark like parts, and whereof—

Figure 1 is a perspective view, and

Figure 2, a side elevation, the thills $c$ $c'$ being elevated in both cases, as when attached to a horse.

It is the object of my invention to produce a horse-rake, whereon the operator sits and rides, and the teeth of which, "independent" within certain limits, may, by a single lever, be raised, or "held down," as circumstances require.

To enable others skilled in the art to practise my invention, I describe the same as follows:

In the accompanying drawings—

The part marked $a$ represents a straight axle-tree, provided with ordinary wheels, $b$ $b'$, and strong thills, $c$ $c'$.

To the rear upper corner of such axle-tree, I hinge, at $d$ $d'$, the head $e$, of nearly the same length as the axle-tree, between wheels, made fast to the upper side of head $e$.

I arrange a series of short arms, $f f^1$, &c., whereof the end and middle arms $f f^5 f^9$ are somewhat longer than the others, and extend back of head $e$ a short distance.

The teeth $g$ $g'$, &c., I insert in separate bars, $h$ $h'$, &c., and strengthen the connections by a brace, $i$.

The bars $h$ $h'$, &c., I arrange across the head $e$, by the sides of and between the arms $f f^1$, &c.; and through the series, and connecting the same, I pass a rod, $j$, whereon each tooth-bar, $h$ $h'$, &c., may rise and fall independently.

One of the arms, as $f^5$, I make higher than the rest of the series, and through it, parallel to head $e$, I pass a bar, $k$, and attach the same, at $l$ $l'$, to arms $f f^9$, by bolts or other suitable means, of such a length as to allow head $e$ to rock, or roll, a short distance, without raising or depressing the points of teeth $g$ $g'$, &c.

To the cross-bar $m$ of the thills $c$ $c'$, I make fast a forked piece, $n$, in the slot whereof I pivot, at $o$, a lever, or brake, $p$.

From the lower end of lever $p$, and jointed thereto, I run a rod, $r$, which is again jointed to rod $j$, or to one of the arms, as $f^6 f^7$, near rod $j$.

A little in front of the middle of axle-tree $a$, I arrange a seat, $s$, which is supported by a brace, $t$, attached at the foot to cross-bar $m$, or to axle-tree $a$.

I arrange the whiffle-tree $u$ under the cross-bar $m$, and provide a rod, $w$, which connects such whiffle-tree with axle-tree $a$.

The horse is attached to the rake in the usual manner, and the workman operates the same by means of the lever, $p$.

By moving lever $p$ backward, the head $e$ is rocked forward, arms $f f^1$, &c., are depressed, and teeth $g$ $g'$, &c., raised, for passing windrows or other purposes, and the teeth may be thus held in an elevated position by means of a hasp, or similar device, attached to the rear and top of one of the arms, as $f^7$, and hitched into a staple on lever $p$.

But pressure on the teeth $g$ $g'$, &c., for the purpose of "holding down" the same, is often necessary, and this I accomplish by moving lever $p$ forward, whereby head $e$ is rocked backward, and rod $k$ thus brought to bear on bars $h$ $h'$, &c.

And it is to the above-described device, whereby rake-teeth, "independent" within certain limits, are raised or "held down" by a single lever, that my invention particularly relates.

And now, having described my improved horse-rake,

What I claim therein as new, and desire to secure by Letters Patent, is—

The vibrating head $e$, provided with arms $f f^5 f^9$, in combination with rod $k$, teeth $g$ $g'$, and lever $p$, the whole arranged and operating substantially as described.

JOSEPH LA CROIX.

Witnesses:
JOHN A. HALL,
SIDNEY SANDERS.